United States Patent
Ueda et al.

(10) Patent No.: US 11,795,013 B2
(45) Date of Patent: Oct. 24, 2023

(54) ARTICLE TRANSPORT FACILITY

(71) Applicant: DAIFUKU CO., LTD., Osaka (JP)

(72) Inventors: Yuichi Ueda, Shiga (JP); Osamu Matsui, Shiga (JP); Hiroyuki Koide, Shiga (JP); Atsushi Ishikura, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 231 days.

(21) Appl. No.: 17/422,915

(22) PCT Filed: Nov. 21, 2019

(86) PCT No.: PCT/JP2019/045671
§ 371 (c)(1),
(2) Date: Jul. 14, 2021

(87) PCT Pub. No.: WO2020/152966
PCT Pub. Date: Jul. 30, 2020

(65) Prior Publication Data
US 2022/0089384 A1 Mar. 24, 2022

(30) Foreign Application Priority Data

Jan. 23, 2019 (JP) .................................. 2019-008867

(51) Int. Cl.
*B65G 43/08* (2006.01)
*B65G 47/32* (2006.01)
(Continued)

(52) U.S. Cl.
CPC ............. *B65G 47/96* (2013.01); *B65G 43/08* (2013.01); *B65G 47/32* (2013.01); *B65G 47/681* (2013.01); *B65G 2201/0285* (2013.01)

(58) Field of Classification Search
CPC ........ B65G 47/96; B65G 43/08; B65G 47/32; B65G 47/681; B65G 2201/0285
See application file for complete search history.

(56) References Cited

U.S. PATENT DOCUMENTS

| 5,135,102 A | 8/1992 | Sjogren et al. |
| 5,588,520 A | 12/1996 | Affaticati et al. |

(Continued)

FOREIGN PATENT DOCUMENTS

| CN | 1444355 A | 9/2003 |
| CN | 105873838 A | 8/2016 |

(Continued)

OTHER PUBLICATIONS

Extended European Search Report issued in European Patent Application No. 19911329.1 dated Dec. 5, 2022.

(Continued)

*Primary Examiner* — Gene O Crawford
*Assistant Examiner* — Lester Rushin, III
(74) *Attorney, Agent, or Firm* — KUSNER & JAFFE

(57) ABSTRACT

An article transport facility includes a main conveyor device and induction conveyors. The main conveyor device includes belt conveyors and carriage bodies. The induction conveyor includes a first conveyor device for loading article onto a second transport path and a second conveyor device that is provided for an article-loading position on a transport path and loads the article onto the belt conveyor. The first conveyor device adjusts the timing of loading the article to the article-loading position, by controlling the timing of loading the article onto the second conveyor device. The second conveyor device adjusts, on the belt conveyors, loading position of the article loaded onto the belt conveyor by controlling the timing of loading the article onto the belt conveyor.

4 Claims, 6 Drawing Sheets

(51) Int. Cl.
    *B65G 47/68* (2006.01)
    *B65G 47/96* (2006.01)

(56) References Cited

U.S. PATENT DOCUMENTS

| | | | |
|---|---|---|---|
| 6,513,641 | B1 | 2/2003 | Affaticati et al. |
| 6,808,058 | B2 | 10/2004 | Shiohara |
| 7,863,536 | B2 * | 1/2011 | Cerutti ............... B07C 3/02 |
| | | | 209/912 |
| 10,569,959 | B1 * | 2/2020 | Rodgers ............. B65G 47/96 |
| 10,689,200 | B1 * | 6/2020 | Lwali ............... B65G 47/493 |
| 2002/0017537 | A1 | 2/2002 | Barklin et al. |
| 2004/0024489 | A1 | 2/2004 | Fujiki et al. |
| 2005/0189271 | A1 | 9/2005 | Cerutti et al. |
| 2009/0065330 | A1 | 3/2009 | Lupton et al. |
| 2015/0360877 | A1 | 12/2015 | Shin |
| 2016/0257501 | A1 | 9/2016 | Chierego et al. |
| 2018/0111710 | A1 | 4/2018 | Choplin et al. |

FOREIGN PATENT DOCUMENTS

| | | | |
|---|---|---|---|
| DE | 100 49 100 A1 | 4/2002 | |
| FR | 3011537 A1 * | 4/2015 | ............. B07C 1/04 |
| JP | 57-184011 A | 11/1982 | |
| JP | 03-158315 A | 7/1991 | |
| JP | 10-139130 A | 5/1998 | |
| JP | 2000-185817 A | 7/2000 | |
| JP | 2006-199505 A | 8/2006 | |
| JP | 2012-035958 A | 2/2012 | |
| KR | KR200334924 Y1 * | 12/2003 | |
| WO | WO02096785 A2 * | 12/2002 | |

OTHER PUBLICATIONS

Chinese Office Action issued in corresponding Chinese Patent Application No. 201980088637.1 dated Jul. 11, 2022.
International Search Report from corresponding International Patent Application No. PCT/JP2019/045671, dated Feb. 4, 2020.
Office Action issued in corresponding Taiwanese Patent Application No. 108144636 dated Jun. 8, 2023.

* cited by examiner

ARTICLE TRANSPORT FACILITY

FIELD OF THE INVENTION

The present invention relates to an article transport facility including a main conveyor device for transporting an article along a predetermined transport path, and an article loading device for loading the article onto the transport path.

BACKGROUND OF THE INVENTION

As a conventional article transport facility including an article loading device for loading an article onto an article transport path, a cross-belt sorter described in Japanese Patent Laid-Open No. 2006-199505 is available.

The cross-belt sorter of Japanese Patent Laid-Open No. 2006-199505 includes at least one parcel introduction station (article loading device) and at least one unloading station that are connected to each other via a ring-shaped transport path, and a plurality of transport units (article supports, traveling units) that successively move along the transport path. In the cross-belt sorter of Japanese Patent Laid-Open No. 2006-199505, parcels (articles) are loaded from the parcel introduction station into the transport units. The loaded parcels are transported by the transport units along the transport path to the unloading station, and then the parcels are unloaded from the transport units.

The parcel introduction station includes consecutive conveyors that are separately controlled. The parcel introduction station is placed at a certain angle with respect to the transport path. The parcel introduction station loads parcels into target transport units while transporting the parcels by means of the conveyors.

In the article transport facility described in Japanese Patent Laid-Open No. 2006-199505, articles are to be loaded from the article loading device to predetermined one of the article supports that sequentially travel on the transport path. However, if an article having small shapes is sequentially loaded into the article support subsequently to an article having large shapes (lengths in the transport direction of articles), the acceleration of the large article in synchronization with the traveling speed of the article support may accelerate the subsequent small article, which are not to be accelerated, along with the large article. Unfortunately, this may prevent the subsequent small article from being loaded into a target article support where the small article are to be loaded. Thus, in order to sequentially load articles having different shapes into respective target article supports, it is necessary to reduce, for example, the transport capacity (transport speed) of a main conveyor device, which is a destination of the loaded articles.

SUMMARY OF THE INVENTION

An object of the present invention is to provide an article transport facility capable of securely loading articles having different shapes (sizes) into target article supports in a sequential manner without reducing the transport capacity (transport speed) of a main conveyor device, which is a destination of articles loaded by an article loading device.

A solution to the technical problem of the present invention will be described below.

Specifically, an article transport facility according to the present invention includes a main conveyor device for transporting an article along a predetermined transport path, and an article loading device for loading the article onto the transport path, the main conveyor device including: an article support for supporting the loaded article; and traveling units for causing the article support to travel along a transport direction of the article, the article loading device including: a first conveyor device for transporting the article along a first transport path and loading the article onto a second transport path joining the transport path; and a second conveyor device provided for an article-loading position on the transport path, the second conveyor device transporting the article along the second transport path joining the first transport path, and loading, at the article-loading position, the article onto the article support traveling along the transport path, wherein the first conveyor device adjusts timing of loading the article to the article-loading position by the second conveyor device, by controlling timing of loading the article onto the second conveyor device, and the second conveyor device adjusts a loading position of the article on the article support when loading the article onto the article support, by controlling timing of loading the article onto the article support.

With this configuration, on the first transport path (first conveyor device), the timing of loading the article onto the second conveyor device so as to adjust the timing of loading the article to the article-loading position by the second conveyor device. Subsequently, on the second transport path (second conveyor device) different from the first transport path (first conveyor device), the timing of loading the article onto the article support is controlled so as to adjust the loading position of the article on the article support when loading the article onto the article support.

In the article transport facility according to the present invention, the first conveyor device controls the timing of loading the article onto the second transport path, based on the length of the article in the transport direction, the article being transported along the first transport path.

With this configuration, the timing of loading the article onto the second transport path is controlled based on the length of the article (the size of the article) transported along the first transport path.

In the article transport facility according to the present invention, the first conveyor device controls the timing of loading the article onto the second transport path, based on the length of the article in the width direction, the article being transported along the first transport path.

With this configuration, the timing of loading the article onto the second transport path is controlled based on the width of the article transported along the first transport path.

In the article transport facility according to the present invention, the first conveyor device controls the timing of loading the article onto the second transport path, based on a difference in length between two articles in the transport direction, the articles being transported next to each other along the first transport path.

With this configuration, based on the difference in length between the two articles (a difference in size between the articles) transported next to each other along the first transport path, the timing of loading one of the two articles on the upstream side of the first transport path (the rear side in the transport direction of the article) to the second transport path is controlled.

In the article transport facility according to the present invention, the first conveyor device controls a pitch between two articles on the first conveyor device based on a difference in length between the two articles in the transport direction, the articles being transported next to each other along the first transport path.

With this configuration, while the pitch between the two articles transported along the first transport path is set at a predetermined pitch controlled based on the difference in length between the two articles, the first conveyor device loads the two articles onto the second transport path.

In the article transport facility according to the present invention, the article loading device is provided for each of a plurality of article-loading positions provided on the transport path, and the article loading device loads the article to a certain article support in every predetermined number of article supports from among a plurality of article supports traveling along the transport path.

With this configuration, the article loading device loads the article to a certain article support in every predetermined number of article supports, thereby loading the article to the determined article supports.

In the article transport facility according to the present invention, if the article is not allowed to be loaded onto the article support to be loaded with the article determined by the first conveyor device, the second conveyor device loads the article onto the article support after a predetermined number of article supports pass through the article-loading position subsequently to the article support to be loaded with the article.

With this configuration, if the article is not allowed to be loaded onto the article support to be loaded with the article determined by the first conveyor device, the second conveyor device loads the article onto the article support after skipping a predetermined number of article supports subsequently to the article support to be loaded with the article.

According to the article transport facility of the present invention, the timing of loading the article to the article-loading position by the second conveyor device is adjusted in advance on the first transport path (first conveyor device) different from the second transport path (second conveyor device) for loading the article onto the article support. Furthermore, on the second transport path (second conveyor device) immediately before the article is loaded onto the article support, the loading position of the article on the article support is adjusted when the article is loaded onto the article support. This can control the transport of the article on the second transport path (second conveyor device) according to the transport capacity (transport speed) of the main conveyor device regardless of the shapes (sizes) of the article. Thus, the article loading device can securely load the articles having different shapes (sizes) to the target article supports in a sequential manner without reducing the transport capacity (transport speed) of the main conveyor device.

DETAILED DESCRIPTION OF THE INVENTION

An article transport facility 10 according to an embodiment of the present invention will be described below.

Figure 1:
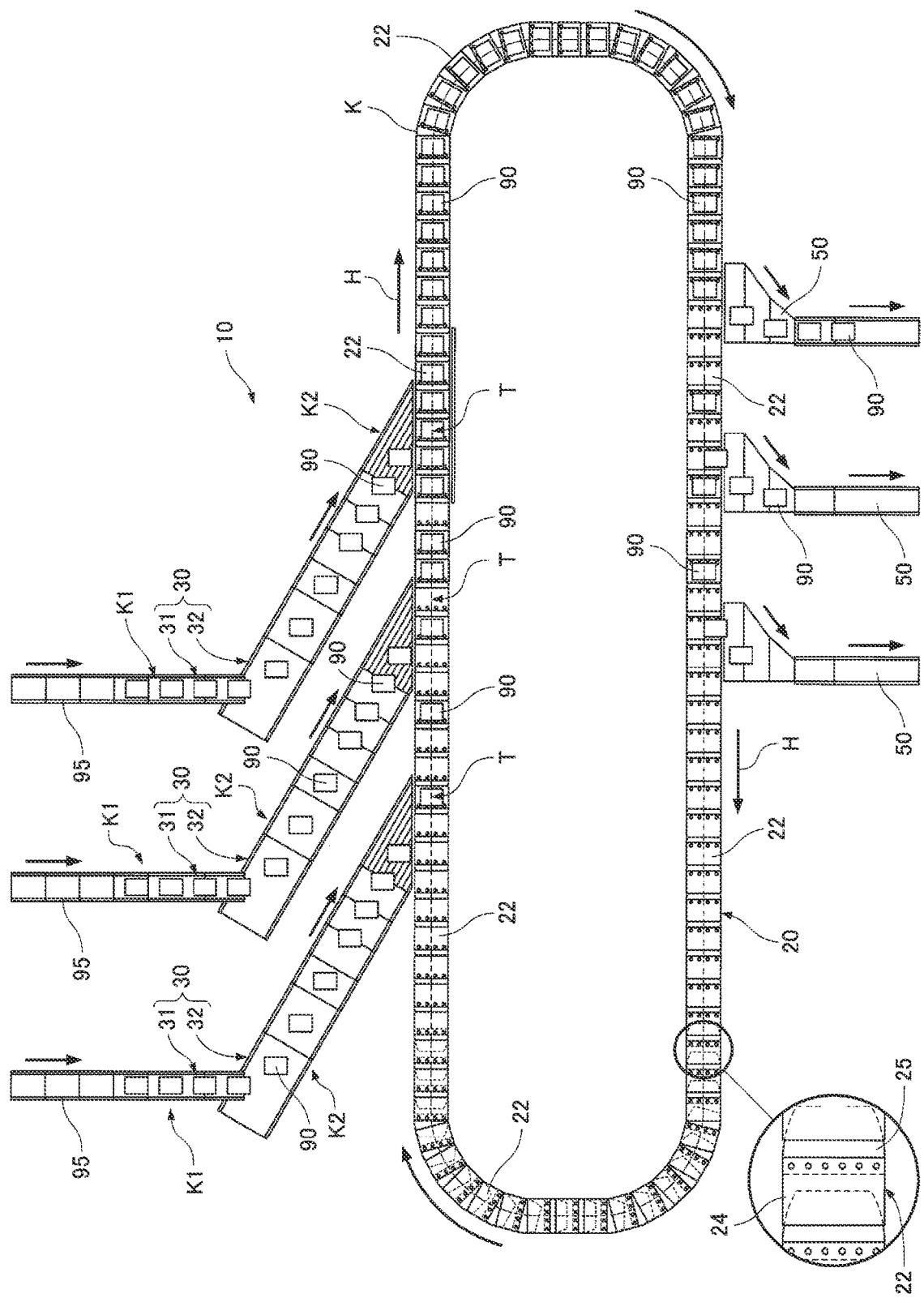
FIG. 1 is a schematic plan view illustrating an article transport facility according to the present invention.

As illustrated in FIG. 1, a loop transport path K is formed in the article transport facility 10. The article transport facility 10 mainly includes a main conveyor device 20 for transporting article 90 along the transport path K, a plurality of induction conveyors 30 (an example of "article loading device") for loading the article 90 onto the transport path K of the main conveyor device 20, and a plurality of chutes 50 for receiving the article 90 unloaded from the transport path K of the main conveyor device 20. In the article transport facility 10, the article 90 is loaded onto the transport path K of the main conveyor device 20 from the predetermined induction conveyor 30. The article 90 to be loaded onto the transport path K is received at an article-loading position T by the main conveyor device 20. The article 90 is transported by the main conveyor device 20 along the transport path K. The article 90 transported by the main conveyor device 20 is unloaded into the chutes 50. To the chutes 50, stores are allocated as the destinations of the sorted article 90. The article 90 is unloaded into the chutes 50 so as to be sorted into the stores allocated to the respective chutes 50. The devices (the main conveyor device 20, the induction conveyors 30, the chutes 50) of the article transport facility 10 are connected to a centralized controller 80 (see FIG. 4) for controlling the overall article transport facility 10 and are controlled by the centralized controller 80.

Figure 2:
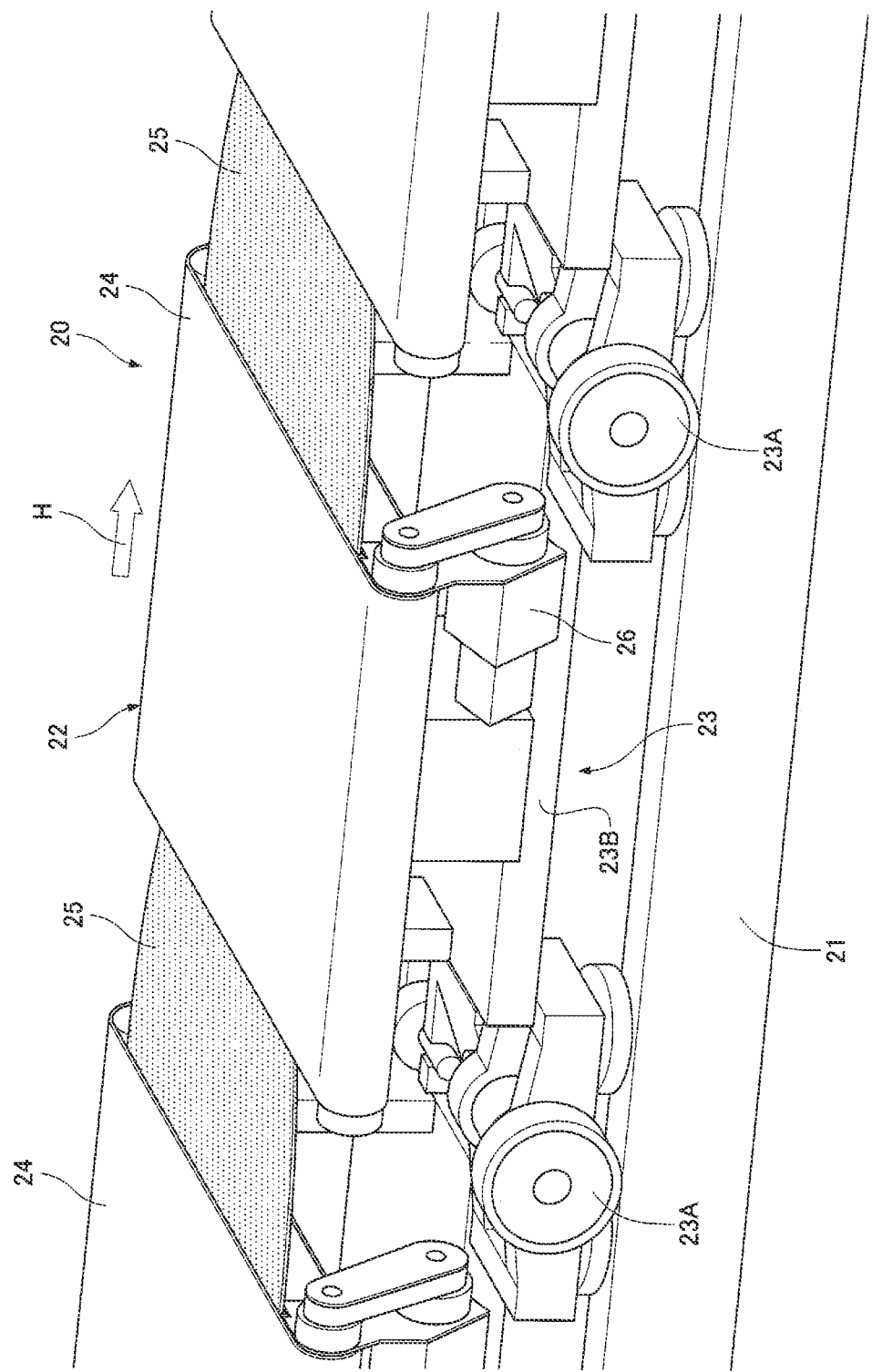
FIG. 2 is a perspective view illustrating a carriage that is a main conveyor device for the article transport facility according to the present invention.

As illustrated in FIGS. 1 and 2, the main conveyor device 20 mainly includes a rail 21 provided along the transport path K and a plurality of carriages 22 traveling along the rail 21. The main conveyor device 20 causes the carriages 22 bearing the articles 90 to travel on the rail 21, thereby transporting the articles 90 along the transport path K.

The carriage 22 receives the article 90 loaded from the predetermined induction conveyor 30, at the article-loading position T. The carriage 22 transports the received article 90 along the transport path K and unload the article 90 into the predetermined chute 50. The carriage 22 is connected to the adjacent carriage 22 on the transport path K and travel on the rail 21 while being connected to the other adjacent carriage 22. The carriage 22 mainly includes a carriage body 23 (an example of "traveling unit") traveling on the rail 21, a belt conveyor 24 (an example of "article support") for supporting the loaded article 90, and a cover 25 covering a gap between the adjacent carriages 22.

As illustrated in FIG. 2, the carriage body 23 mainly includes wheels 23A for traveling on the rail 21 and a frame 23B for supporting the wheels 23A and the belt conveyor 24 or the like.

The belt conveyor 24 is provided above the carriage body 23. The belt conveyor 24 is configured so as to be able to transport each of the loaded article 90 in a direction orthogonal to the traveling direction (a transport direction H of the article 90) of the carriage 22. The belt conveyor 24 has a motor 26 for driving a belt. The belt conveyor 24 drives the belt when the carriage 22 reaches the predetermined chute 50, thereby discharging the article 90 to the position of the chute 50. If the article 90 is displaced from a proper position on the belt conveyor 24 when being transported by the carriage 22, the belt conveyor 24 drives the belt so as to adjust the loading position of the displaced article 90 to the proper position.

The cover 25 includes a plate member covering a gap between the adjacent carriages 22 on the transport path K. The cover 25 is fixed to the rear end (the rear end with respect to the traveling direction of the carriage 22) of the carriage 22.

Figure 3:
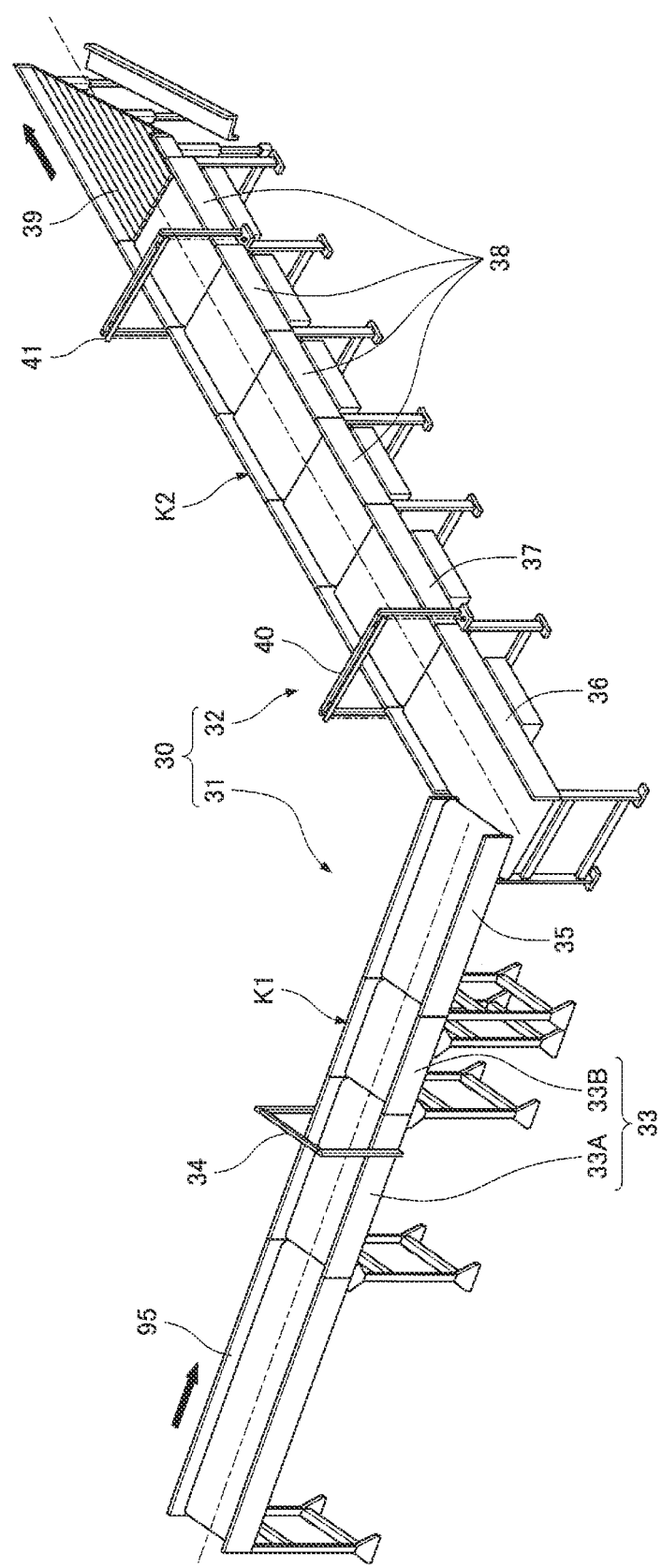
FIG. 3 is a perspective view illustrating an induction conveyor for the article transport facility according to the present invention.

As illustrated in FIGS. 1 and 3, on one side of the transport path K, the induction conveyor 30 diagonally transports the article 90 along a direction from the upstream side to the downstream side of the traveling direction of the carriage 22, and loads the article 90 onto the belt conveyor 24 of the carriage 22 while keeping the orientation of the transported article 90. A plurality of the induction conveyors 30 (three in FIG. 1) are provided along the transport path K. The induction conveyors 30 are provided at the respective article-loading positions T (positions where the induction conveyor 30 loads the article 90 onto the belt conveyor 24 of the carriages 22) at multiple points (three points in FIG. 1) on the transport path K. In the induction conveyor 30, the centralized controller 80 searches for the carriage 22 to be loaded with the article 90 for the induction conveyor 30, thereby determining the carriage 22 to be loaded with the article 90. The induction conveyor 30 loads the article 90 onto the predetermined carriage 22 for the induction conveyor 30.

The induction conveyor 30 includes a first transport path K1 and a second transport path K2. The article 90 is sequentially transported from the first transport path K1 to the second transport path K2. The first transport path K1 receives the article 90 supplied on the upstream side. The first transport path K1 joins the upstream side of the second transport path K2 while the downstream side of the second transport path K2 joins the transport path K.

The first transport path K1 is formed in a direction perpendicularly to the transport path K. The first transport path K1 joins the second transport path K2 at a predetermined angle. On the upstream side of the first transport path K1, the article 90 is supplied into the induction conveyor 30. On the downstream side of the first transport path K1, the transport path of the article 90 is changed from the first transport path K1 to the second transport path K2.

The second transport path K2 diagonally joins the transport path K at a predetermined angle along a direction from the upstream side to the downstream side of the transport direction H of the article 90 on the transport path K. On the upstream side of the second transport path K2, the article 90 transported from the first transport path is loaded. On the downstream side of the second transport path K2, the article 90 is loaded onto the carriage 22.

As illustrated in FIG. 3, the induction conveyor 30 mainly includes a first conveyor device 31 for transporting the article 90 along the first transport path K1 and a second conveyor device 32 for transporting the article 90 along the second transport path K2.

Figure 4:
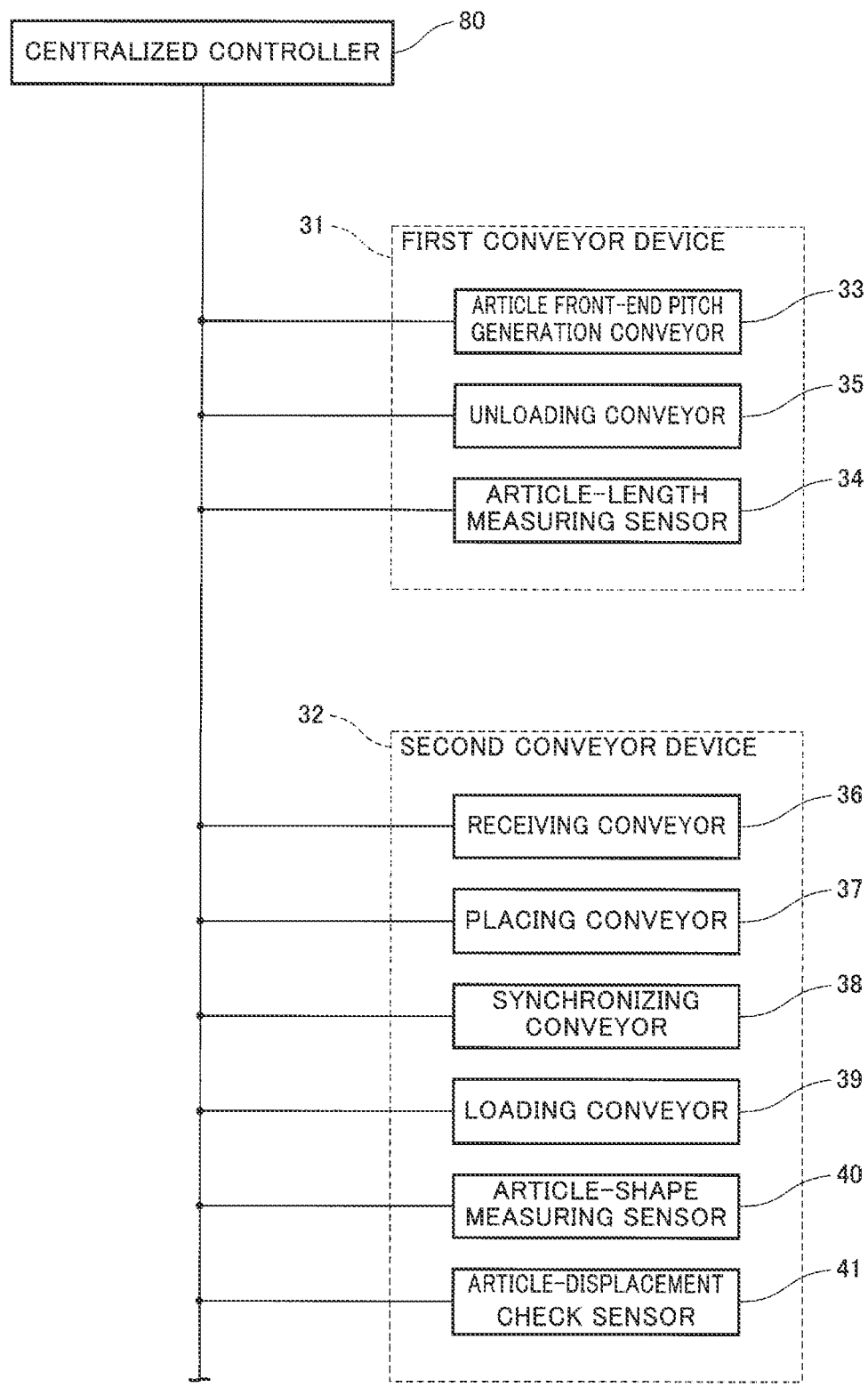
FIG. 4 is a block diagram illustrating the control system of the induction conveyor for the article transport facility according to the present invention.

The first conveyor device 31 receives the article 90 supplied from the upstream side of the first transport path K1 and transports the received article 90 to the second transport path K2 on the downstream side of the first transport path K1. The first conveyor device 31 includes an article front-end pitch generation conveyor 33 and an unloading conveyor 35 that are sequentially disposed in the order in which the article 90 moves from the upstream side to the downstream side of the first transport path K1. As illustrated in FIG. 4, the conveyors (the article front-end pitch generation conveyor 33, the unloading conveyor 35) of the first conveyor device 31 are connected to the centralized controller 80 for controlling the overall first conveyor device 31 and are controlled by the centralized controller 80.

Figure 5:
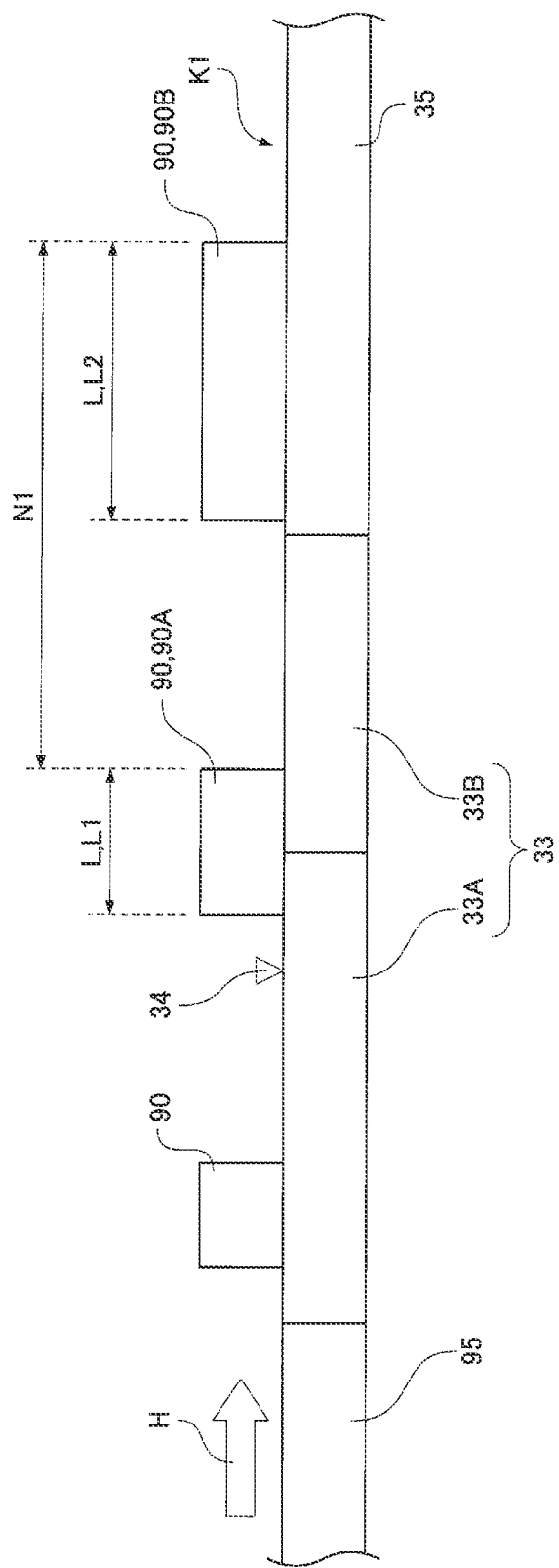
FIG. 5 is a schematic side view illustrating a transporting operation of article on a first conveyor device in the induction conveyor for the article transport facility according to the present invention.

As illustrated in FIGS. 3 and 5, the article front-end pitch generation conveyor 33 is a conveyor disposed on the upstream side of the first transport path K1. The article front-end pitch generation conveyor 33 includes two conveyors: an upstream-side conveyor 33A disposed on the upstream side of the first transport path K1 and a downstream-side conveyor 33B disposed on the downstream side of the first transport path K1.

The upstream-side conveyor 33A is a delivery conveyor for delivering the article 90 supplied from the upstream side of the upstream-side conveyor 33A to the downstream-side conveyor 33B. The upstream side of the upstream-side conveyor 33A is connected to a supply conveyor 95 for supplying the article 90 to the first conveyor device 31. The downstream side of the upstream-side conveyor 33A is connected to the downstream-side conveyor 33B. The upstream-side conveyor 33A delivers the article 90, which is sequentially supplied from the supply conveyor 95, to the downstream-side conveyor 33B.

The downstream-side conveyor 33B is an article front-end pitch adjustment conveyor for adjusting an article front-end pitch N1 between two articles 90 transported next to each other along the first transport path K1. The article front-end pitch N1 between the two articles 90 transported next to each other is a distance between the front edge of one of the two articles 90 on the upstream side of the first transport path K1 (the rear side in the transport direction H of the article 90) and the front edge of the other of the two articles 90 on the downstream side (the front side in the transport direction H of the article 90). The downstream-side conveyor 33B adjusts the article front-end pitch N1 by controlling the timing of delivering one of the two articles 90, which are delivered next to each other by the upstream-side conveyor 33A, on the upstream side of the first transport path K1 (the rear side in the transport direction H of the article 90) to the unloading conveyor 35.

The upstream-side conveyor 33A is provided with an article-length measuring sensor 34 for measuring a length L of the article 90 transported in the transport direction H by the upstream-side conveyor 33A and a length W (FIG. 6) in the width direction of the article 90 (a direction horizontally perpendicular to the transport direction H of the article 90). The article-length measuring sensor 34 is a sensor having multiple optical axes with a plurality of optically uniaxial photoelectronic sensors connected in series. The article-length measuring sensor 34 is configured such that the plurality of optically uniaxial photoelectronic sensors are disposed in series above the upstream-side conveyor 33A, in parallel with the transport surface of the upstream-side conveyor 33A, and perpendicularly to the upstream-side conveyor 33A. The article-length measuring sensor 34 has a detectable range in the width direction of the upstream-side conveyor 33A (perpendicularly to the direction of transport of the article 90 (the transport direction H of the article 90) by the upstream-side conveyor 33A on a plane parallel to the transport surface of the upstream-side conveyor 33A). As illustrated in FIG. 4, the article-length measuring sensor 34 is connected to the centralized controller 80. The article-length measuring sensor 34 detects the article 90 transported by the upstream-side conveyor 33A and transmits a detection signal to the centralized controller 80. The centralized controller 80 measures the length L of the article 90 in the transport direction H based on the transport speed of the upstream-side conveyor 33A and a time from the start (ON)

to the end (OFF) of the detection of the article 90 by the article-length measuring sensor 34. Furthermore, the centralized controller 80 measures the article front-end pitch N1 between the articles 90 on the upstream side and the downstream side based on the transport speed of the upstream-side conveyor 33A and a time from the start (ON) of detection of the article 90 on the downstream side to the start (ON) of the detection of the article 90 on the upstream side by the article-length measuring sensor 34. Moreover, the centralized controller 80 measures the length W in the width direction of the article 90 based on the detection signals of the optically uniaxial photoelectronic sensors having detected the article 90 (the number of optically uniaxial photoelectronic sensors having detected the article 90) from among the optically uniaxial photoelectronic sensors constituting the article-length measuring sensor 34.

As illustrated in FIG. 3, the unloading conveyor 35 is a conveyor disposed on the downstream side of the first transport path K1. The upstream side of the unloading conveyor 35 is connected to the downstream-side conveyor 33B of the article front-end pitch generation conveyor 33. The downstream side of the unloading conveyor 35 is directed to a receiving conveyor 36 of the second conveyor device 32. The transport surface of the unloading conveyor 35 is disposed above the transport surface of the receiving conveyor 36. The unloading conveyor 35 unloads the article 90 dropping onto the receiving conveyor 36. The unloading conveyor 35 transports the article 90 delivered from the downstream-side conveyor 33B and unloads the transported article 90 onto the receiving conveyor 36 at the most downstream position.

As illustrated in FIGS. 1 and 3, the second conveyor device 32 receives the article 90 loaded from the first conveyor device 31 on the upstream side of the second transport path K2 and loads the received article 90 onto the carriage 22 of the main conveyor device 20 at the article-loading position T that is the most downstream position of the second transport path K2. The second conveyor device 32 includes the receiving conveyor 36, a placing conveyor 37, synchronizing conveyors 38, and a loading conveyor 39 that are sequentially disposed in the order in which the article 90 move from the upstream side to the downstream side of the second transport path K2. As illustrated in FIG. 4, the conveyors (the receiving conveyor 36, the placing conveyor 37, the synchronizing conveyors 38, and the loading conveyor 39) of the second conveyor device 32 are connected to the centralized controller 80 for controlling the overall second conveyor device 32 and are controlled by the centralized controller 80.

As illustrated in FIG. 3, the receiving conveyor 36 is disposed on the most upstream side of the second transport path K2. The receiving conveyor 36 receives the article 90 loaded from the first conveyor device 31 (the unloading conveyor 35) and transports the received article 90 downstream to the placing conveyor 37 while keeping the states of the article 90.

The placing conveyor 37 transports the article 90 transported by the receiving conveyor 36, downstream to the synchronizing conveyors 38.

The synchronizing conveyors 38 move the article 90 transported by the placing conveyor 37, in synchronization with the traveling of the carriage 22 of the main conveyor device 20. The synchronizing conveyors 38 are multiple conveyors sequentially disposed along the second transport path K2.

The loading conveyor 39 is disposed on the most downstream side of the second transport path K. The loading conveyor 39 loads the article 90 transported by the synchronizing conveyors 38, onto the carriage 22 of the main conveyor device 20.

As illustrated in FIGS. 3 and 4, an article-shape measuring sensor 40 is provided at the joining section between the receiving conveyor 36 and the placing conveyor 37. The article-shape measuring sensor 40 is a photoelectronic sensor with multiple optical axes disposed along the width direction of the receiving conveyor 36 and the placing conveyor 37. The article-shape measuring sensor 40 is connected to the centralized controller 80. The article-shape measuring sensor 40 detects the article 90 transported by the receiving conveyor 36 and transmits a detection signal to the centralized controller 80. The centralized controller 80 measures, based on the detection signal transmitted from the article-shape measuring sensor 40, the shape of the article 90 (the length L of the article 90 in the transport direction H and the length W of the article 90 in the width direction), the center of the article 90, and the inclination of the article 90 by the receiving conveyor 36 (placing conveyor 37) relative to the transport direction H of the article 90. Moreover, based on the detection signal transmitted from the article-shape measuring sensor 40, the centralized controller 80 searches carriages 22 of the main conveyor device 20 and determines a carriage 22 to be loaded with the article 90 on the loading conveyor 39. Specifically, when the article-shape measuring sensor 40 starts (ON) detecting the article 90 transported by the receiving conveyor 36 (the front ends of the article 90 in the transport direction H are detected by the article-shape measuring sensor 40), the centralized controller 80 searches for a carriage 22 to be loaded with the article 90 on the loading conveyor 39 based on the detection signal transmitted from the article-shape measuring sensor 40. When the article-shape measuring sensor 40 terminates (OFF) the detection of the article 90 (the article 90 have passed through the article-shape measuring sensor 40), the carriage 22 to be loaded with the article 90 on the loading conveyor 39 is determined by the centralized controller 80.

One of the synchronizing conveyors 38 is provided with an article-displacement check sensor 41 at the most downstream side. The article-displacement check sensor 41 is a photoelectronic sensor with multiple optical axes disposed along the width direction of the synchronizing conveyors 38. The article-displacement check sensor 41 is connected to the centralized controller 80. The article-displacement check sensor 41 detects the article 90 transported by the synchronizing conveyors 38 and transmits a detection signal to the centralized controller 80. The centralized controller 80 confirms whether the article 90 detected by the article-displacement check sensor 41 can be loaded onto the carriage 22 determined during the passage of the article 90 through the article-shape measuring sensor 40, based on the detection signal transmitted from the article-displacement check sensor 41.

As illustrated in FIG. 1, the chutes 50 receive the article 90 unloaded from the carriage 22 and transport the received article 90 to another downstream facility (e.g., a shipping facility) or directly to a vehicle (e.g., a truck) or the like. A plurality of the chutes 50 (three in FIG. 1) are provided along the transport path K. The chutes 50 each receive the predetermined article 90 from the carriage 22. The chute 50 is a combination of, for example, plate members such as an iron plate, roller conveyors, and belt conveyors. The chutes 50 are tilted downward from above with respect to the main conveyor device 20.

The transport of the article 90 on the induction conveyor 30 (the first conveyor device 31 and the second conveyor device 32) will be described below.

The transport of the article 90 on the first conveyor device 31 will be described below.

On the first conveyor device 31, the article 90 is supplied from the supply conveyor 95 to the article front-end pitch generation conveyor 33. The supplied article 90 is delivered from the article front-end pitch generation conveyor 33 to the unloading conveyor 35 after the article front-end pitch N1 from the adjacent article 90 on the downstream side is adjusted to at least a predetermined article front-end pitch.

As illustrated in FIG. 5, on the article front-end pitch generation conveyor 33, the article front-end pitch N1 between two articles 90 (90A, 90B) sequentially supplied from the supply conveyor 95 is adjusted by controlling the timing (transport speed) of delivering the article 90 (90A) to the unloading conveyor 35 by the downstream-side conveyor 33B, the article 90 (90A) being disposed on the upstream side (the rear side in the transport direction H of the article 90) of the first transport path K1. On the downstream-side conveyor 33B, the timing (transport speed) of delivering the article 90 on the upstream side to the unloading conveyor 35 is controlled depending upon whether the article front-end pitch N1 is at least a required article front-end pitch between the article 90 (the article 90A on the upstream side) transported by the upstream-side conveyor 33A and the article 90B on the downstream side, that is, the article 90 delivered onto the unloading conveyor 35 by the downstream-side conveyor 33B while being transported next to the article 90A on the upstream side. In this case, the required article front-end pitch is an article front-end pitch that is set between the two articles 90 (90A, 90B) and required to securely load the article 90 onto the target carriage 22 on the second conveyor device 32 (loading conveyor 39), that is, a distance between the front edge of article 90 on the upstream side and the front edge of the article 90 on the downstream side. The distance is calculated based on a difference between a length L1 of the article 90A on the upstream side (a length of the article 90 in the transport direction H) and a length L2 of the article 90B on the downstream side (a length of the article 90 in the transport direction H), a difference between the length W of article 90A in the width direction on the upstream side and the length W of the article 90B in the width direction on the downstream side, the transport speed of the article front-end pitch generation conveyor 33, the transport speed of the unloading conveyor 35, and the throughput of the induction conveyor 30. The required article front-end pitch is calculated based on a difference between the length L1 of the article 90A on the upstream side and the length L2 of the article 90B on the downstream side and a difference between the length W of the article 90A in the width direction on the upstream side and the length W of the article 90B in the width direction on the downstream side, that is, the required article front-end pitch is calculated based on the length L of the article 90 in the transport direction H and the length W of the article 90 in the width direction. This can more accurately calculate the required article front-end pitch according to the sizes of the article 90 transported by the first conveyor device 31. Furthermore, the timing (transport speed) of delivering the article 90A on the upstream side from the downstream-side conveyor 33B to the unloading conveyor 35 can be more accurately controlled, the timing being controlled based on the required article front-end pitch and the article front-end pitch N1.

Figure 6:
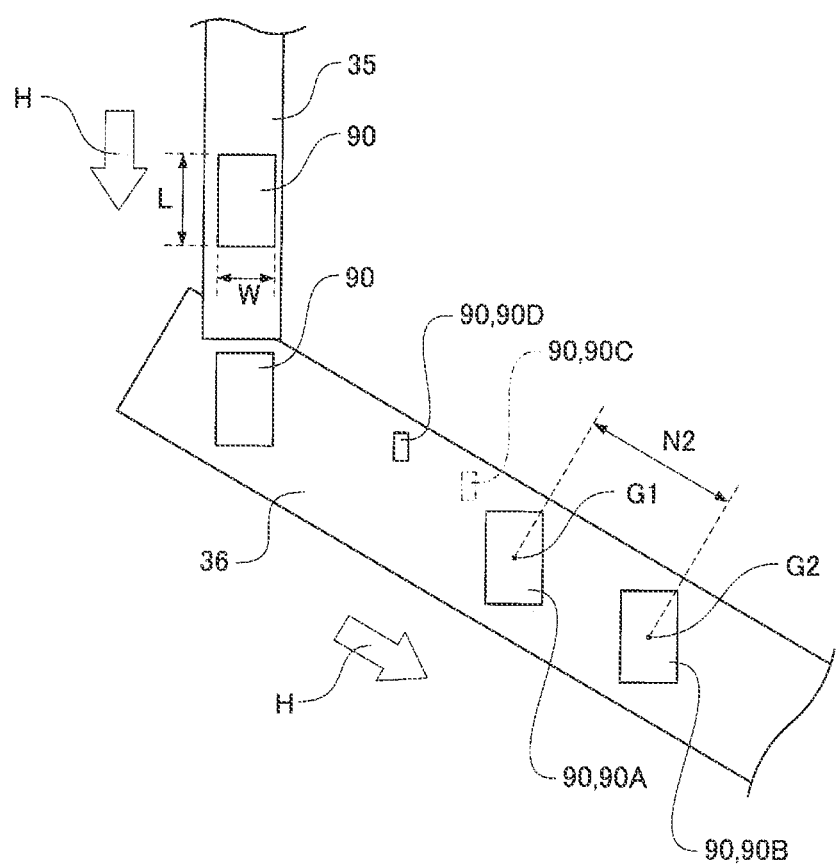
FIG. 6 is a schematic side view illustrating a transporting operation of the article from the first conveyor device to a second conveyor device in the induction conveyor for the article transport facility according to the present invention.

As illustrated in FIGS. 3 and 6, on the induction conveyor 30, the article 90 move from the first conveyor device 31 to the second conveyor device 32 so as to change the transport direction H of the article 90. In other words, the orientation of the article 90 is changed with respect to the transport direction H of the article 90. Specifically, the transport direction H of the article 90 changes from a direction perpendicular to the transport path K to a direction that diagonally joins the transport path K at a predetermined angle along a direction from the upstream side to the downstream side of the traveling direction of the carriage 22 on the transport path K. Thus, it is necessary to change the control of an interval between the two articles 90 transported next to each other from the control according to the article front-end pitch N1 to control according to an article center pitch N2. The article center pitch N2 is a distance between a center position G1 of the article 90A on the upstream side of the second transport path K2 (the rear side in the transport direction H of the article 90) and a center position G2 of the article 90B on the downstream side (the front side in the transport direction H of the article 90), the two articles 90 (90A, 90B) being transported next to each other along the second transport path K2.

On the induction conveyors 30, the article 90 moving from the first conveyor device 31 to the second conveyor device 32 is unloaded so as to be dropped from the first conveyor device 31 (unloading conveyor 35) to the second conveyor device 32 (receiving conveyor 36). Thus, the position of a drop (the position of placement) from the unloading conveyor 35 to the receiving conveyor 36 changes according to the shape of the article 90 (the length of the article 90 in the longitudinal direction, the length of the article 90 in the width direction). Specifically, the article 90 having large shapes (sizes) is dropped around the center position of the receiving conveyor 36 in the width direction (for example, the article 90A, 90B in FIG. 6), whereas the article 90 having small shapes (sizes) is dropped around the end positions of the receiving conveyor 36 near the unloading conveyor 35 in the width direction (for example, article 90C, 90D in FIG. 6).

Hence, if a plurality of articles 90 having considerably different shapes (sizes) are sequentially transported on the first conveyor device 31 with regular article front-end pitches (a distance between the front edge of one of the two articles 90 on the front side in the transport direction H and the front edge of the other of the articles 90 on the rear side in the transport direction H, the two articles 90 being transported next to each other) regardless of a difference in shape (size), the article center pitch N2 between the articles 90 on the second transport path K2 may vary greater than that of the plurality of articles 90 sequentially transported with similar shapes (sizes). Particularly if the article 90 (90C) having small shapes (sizes) is transported subsequently to the article 90 (90A) having large shapes (sizes), the article center pitch N2 between the articles 90 on the second transport path K2 is extremely shorter than that of the articles 90 (the articles 90A, 90B) sequentially transported with similar shapes (sizes). Thus, it is necessary to sequentially change the timing of loading the article 90 from the loading conveyor 39 of the second conveyor device onto the carriage 22 according to a change of the article center pitch N2 between the articles 90, requiring complicated control on the second conveyor device.

With this configuration, in the induction conveyors 30, the article front-end pitch N1 is adjusted (adjusted to a required article front-end pitch) in consideration of the shapes (sizes) of the two articles 90 on the first conveyor device 31

(downstream-side conveyor 33B), so that the article center pitch N2 between the articles 90 moving on the second transport path K2 is controlled to at least a predetermined article center pitch. The article center pitch N2 between the articles 90 on the second transport path K2 is particularly provided as a minimum pitch and a fixed interval, allowing the induction conveyor 30 to securely load the article 90 onto the target carriage 22 (belt conveyor 24) without reducing the transport capacity (transport speed) of the main conveyor device 20. Thus, the article center pitch N2 between the articles 90 on the second transport path K2 is preferably adjusted to a minimum pitch and a fixed interval.

Specifically, as illustrated in FIG. 5, if the article front-end pitch N1 is at least a predetermined article front-end pitch (required article front-end pitch) between the article 90A transported by the upstream-side conveyor 33A on the upstream side and the article 90B on the downstream side, that is, the article 90 delivered onto the unloading conveyor 35 by the downstream-side conveyor 33B while being transported next to the article 90A on the upstream side, the downstream-side conveyor 33B transports the article 90A on the upstream side. If the article front-end pitch N1 is smaller than the required article front-end pitch, the downstream-side conveyor 33B is temporarily stopped to suspend the transport of the article 90A on the upstream side, thereby increasing the article front-end pitch N1 to at least the required article front-end pitch.

Furthermore, in the induction conveyor 30, the article front-end pitch N1 is adjusted (adjusted to the required front-end pitch) on the downstream-side conveyor 33B in consideration of the shapes (sizes) of the two articles 90, thereby controlling the timing of loading the article 90 onto the receiving conveyor 36 (onto the second transport path K2) by the unloading conveyor 35. The article 90 loaded onto the receiving conveyor 36 is transported at a predetermined transport speed to the loading conveyor 39 at the most downstream side. Thus, the control of the timing enables indirect control on the timing of arrival of the article 90 at the loading conveyor 39 at the most downstream side after the article 90 is loaded onto the receiving conveyor 36. In other words, the timing of loading the article 90 to the article-loading position T by the second conveyor device 32 (loading conveyor 39) can be adjusted in advance. Thus, on the downstream-side conveyor 33B, the article front-end pitch N1 is adjusted (adjusted to the required article front-end pitch) in consideration of the shapes (sizes) of the two articles 90, thereby controlling the transport of the article 90 so as to bring the article 90 to the article-loading position T when the carriage 22 (belt conveyors 24) to be loaded with the target article 90 reach the article-loading position T (a position where the loading conveyor 39 loads the article 90 onto the transport path K). Furthermore, as has been discussed, the required article front-end pitch is accurately calculated based on the length L of the article 90 in the transport direction H and the length W of the article 90 in the width direction. Thus, the timing of loading the article 90 onto the receiving conveyor 36 (onto the second transport path K2) by the unloading conveyor 35 can be more correctly controlled according to the sizes of the article 90 transported by the first conveyor device 31.

The transport of the article 90 on the second conveyor device 32 will be described below.

In the second conveyor device 32, the article 90 unloaded from the unloading conveyor 35 of the first conveyor device 31 are received by the receiving conveyor 36, and the received article 90 is transported to the loading conveyor 39 at the most downstream side and is loaded onto the carriage 22.

The article 90 received by the receiving conveyor 36 is detected by the article-shape measuring sensor 40, so that the carriage 22 (belt conveyors 24) to be loaded with the article 90 is allocated to the article 90. The article 90, to which the carriage 22 is allocated, is transported by the synchronizing conveyors 38 so as to move in synchronization with the traveling of the allocated carriage 22. The article 90 transported by the synchronizing conveyors 38 is detected by the article-displacement check sensor 41, thereby detecting a displacement in the synchronization with the carriage 22 (belt conveyors 24) to be loaded with the article 90. If the article-displacement check sensor 41 does not detect a displacement in the synchronization with the carriage 22 (belt conveyors 24) to be loaded with the article 90, that is, if it is determined that the article 90 can be loaded onto the carriages 22 (belt conveyors 24) to be loaded with the article 90, the synchronizing conveyor 38 at the most downstream side directly delivers the article 90 onto the loading conveyor 39. If the article-displacement check sensor 41 detects a displacement in the synchronization with the carriage 22 (belt conveyors 24) to be loaded with the article 90, that is, if it is determined that the article 90 cannot be loaded onto the carriage 22 (belt conveyors 24) to be loaded with the article 90, the synchronizing conveyor 38 at the most downstream side temporarily stops the article 90 or reduces the transport speed of the article 90 so as to correct the displacement in the synchronization with the carriage 22 (belt conveyors 24) to be loaded with the article 90 before delivering the article 90 onto the loading conveyor 39.

As has been discussed, on the downstream-side conveyor 33B, the timing of loading the article 90 onto the receiving conveyor 36 by the unloading conveyor 35 is controlled by adjusting the article front-end pitch N1 between the two articles 90. This controls the timing of loading the article 90 to the article-loading position T by the loading conveyor 39. In the event of a displacement in the synchronization between the article 90 transported to the synchronizing conveyors 38 after the control of the timing on the downstream-side conveyor 33B and the carriage 22 (belt conveyors 24) to be loaded with the article 90, the displacement in the synchronization is corrected on the synchronizing conveyors 38, and then the article 90 are The loading conveyor 39 loads the article 90 delivered from the synchronizing conveyors 38, to a certain carriage in every predetermined number of carriages 22 (belt conveyors 24) from among the carriages 22 (belt conveyors 24) traveling along the transport path K. For example, as illustrated in FIG. 1, if the article 90 is loaded by using the three induction conveyors 30, the carriages 22 traveling along the transport path K are classified into groups, each including three of the carriages 22. The first carriage 22 of the classified three carriages 22 receives the article 90 from the loading conveyor 39 of the most upstream one of the three induction conveyors 30. Subsequently, the central carriage 22 of the classified three carriages 22 receives the article 90 from the loading conveyor 39 of the central one of the three induction conveyors 30. Thereafter, the rearmost carriage 22 of the classified three carriages 22 receives the article 90 from the loading conveyor 39 of the most downstream one of the three induction conveyors 30. In other words, the induction conveyor 30 loads the article 90 to a certain carriage in every three carriages 22 from the loading conveyor 39.

If the article 90 cannot be loaded onto the carriage 22 (belt conveyors 24) to be loaded with the article 90 determined by the first conveyor device 31, the loading conveyor 39 loads the article 90 onto the carriage 22 (belt conveyor 24) after a predetermined number of carriages 22 pass through the article-loading position T subsequently to the carriage 22 (belt conveyors 24) to be loaded with the article 90. For example, as has been discussed, if the article 90 is loaded to a certain carriage in every three carriages 22 from the loading conveyor 39 and the article 90 cannot be loaded onto the carriage 22 to be loaded with the article 90, the loading conveyor 39 loads the article 90 onto the third carriage 22 after the carriage 22 to be loaded with the article 90 passes through the article-loading position T. In other words, the loading conveyor 39 skips the group of the carriage 22 to be loaded with the article 90 and loads the article 90 to the carriage 22 of the subsequent group without changing the number of carriages 22 (three in this example) in each group of the carriages 22 to be loaded with the article 90.

As has been discussed, according to the present embodiment, the timing of loading the article 90 to the article-loading position T by the second conveyor device 32 is adjusted in advance on the first transport path K1 (first conveyor device 31) that is different from the second transport path K2 (second conveyor device 32) for loading the article 90 onto the carriage 22 (belt conveyor 24). Furthermore, on the second transport path K2 (second conveyor device 32) immediately before the article 90 is loaded onto the carriage 22 (belt conveyors 24), the loading position of the article 90 is adjusted on the belt conveyor 24 when the article 90 is loaded onto the belt conveyor 24. This can control the transport of the article 90 on the second transport path K2 (second conveyor device 32) according to the transport capacity (transport speed) of the main conveyor device 20 regardless of the sizes (shapes) of the article 90. Thus, the article 90 having different shapes (sizes) can be securely loaded onto the target carriage 22 (belt conveyors 24) in a sequential manner by the induction conveyor 30 without reducing the transport capacity (transport speed) of the main conveyor device 20.

In the present embodiment, the article support in the main conveyor device 20 (carriage 22) includes, but not limited to, the belt conveyor 24 (self-driven cross-belt type). For example, a tray (tilt-tray type not self-driven) may be configured so as to be able to support the loaded article 90.

In the present embodiment, the centralized controller 80 controls the overall first conveyor device 31 and the overall second conveyor device 32. The present invention is not limited to this control configuration. For example, the control may be configured such that the first conveyor device 31 and the second conveyor device 32 are each controlled by individual controllers (for example, the first conveyor device 31 is controlled by a first controller while the second conveyor device 32 is controlled by a second controller), and the individual controllers (the first controller and the second controller) are controlled by the centralized controller 80 in a centralized manner.

In the present embodiment, the required article front-end pitch calculated for controlling the timing of loading the article 90 onto the receiving conveyor 36 (onto the second transport path K2) by the unloading conveyor 35 is calculated based on the length L of the article 90 in the transport direction H and the length W of the article 90 in the width direction. The present invention is not limited to the required front-end pitch. The required front-end pitch may be calculated based on the length L of the article 90 in the transport direction H regardless of the length W of the article 90 in the width direction.

In the present embodiment, the article-length measuring sensor 34 includes, but is not limited to, a sensor having multiple optical axes with a plurality of optically uniaxial photoelectronic sensors connected in series. The article-length measuring sensor 34 may include a photoelectronic sensor with multiple optical axes. Alternatively, the article-length measuring sensor 34 may include, for example, a laser sensor that can detect the length L of the article 90 in the transport direction H and the length W of the article 90 in the width direction.

In the present embodiment, the article-shape measuring sensor 40 and the article-displacement check sensor 41 each include, but are not limited to, a photoelectronic sensor with multiple optical axes. The sensor may include a sensor having multiple optical axes with a plurality of optically uniaxial photoelectronic sensors connected in series. Alternatively, the article-shape measuring sensor 40 and the article-displacement check sensor 41 may each include, for example, a laser sensor that can detect the length L of the article 90 in the transport direction H and the length W of the article 90 in the width direction.

REFERENCE SIGNS LIST

10 Article transport facility
20 Main conveyor device
23 Carriage body (traveling unit)
24 Belt conveyor (article support)
30 Induction conveyor (article loading device)
31 First conveyor device
32 Second conveyor device
90 Article
K Transport path
K1 First transport path
K2 Second transport path
T Article-loading position

What is claimed is:
1. An article transport facility, comprising:
a main conveyor device for transporting an article along a predetermined transport path, the main conveyor device comprising:
an article support for supporting the article when loaded onto the predetermined transport path; and
traveling units for causing the article support to travel along a transport direction of the article;
an article loading device for loading the article onto the predetermined transport path, the article loading device comprising:
a first conveyor device for transporting the article along a first transport path;
an article-length measuring sensor for measuring a length of the article; and
a second conveyor device to which the article is loaded from the first conveyor device, the second conveyor device being provided for an article-loading position on the predetermined transport path, the second conveyor device being configured to transport the article along a second transport path joining the first transport path and the predetermined transport path, the second conveyor device being further configured to load, at the article-loading position, the article onto the article support traveling along the predetermined transport path; and a controller configured to adjust timing of loading the article to the article-loading position by the second conveyor device by controlling timing of loading the article onto the second conveyor device from the first conveyor device, the timing of loading the article onto the second conveyor device from the first conveyor device being based on a difference in length between two articles being transported next to each other along the first transport path in the transport direction, the length being measured by the article-length measuring sensor, the controller being further configured to adjust a loading position of the article on the article support wen loading the article onto the article support, by controlling timing of loading the article onto the article support by means of the second conveyor device.

2. The article transport facility according to claim 1, wherein the controller is configured to control a pitch between two articles on the first conveyor device based on the difference in length between the two articles.

3. An article transport facility, comprising:
a main conveyor device for transporting an article along a predetermined transport path, the main conveyor device comprising:
an article support for supporting the article when loaded onto the predetermined transport path; and
traveling units for causing the article support to travel along a transport direction of the article;
an article loading device for loading the article onto the predetermined transport path, the article loading device being provided for each of a plurality of article-loading positions provided on the predetermined transport path, the article loading device comprising:
a first conveyor device for transporting the article along a first transport path; and
a second conveyor device to which the article is loaded from the first conveyor device, the second conveyor device being provided for an article-loading position on the predetermined transport path, the second conveyor device being configured to transport the article along a second transports path joining the first transport path and the predetermined transport path, the second conveyor device being further configured to load, at the article-loading position, the article onto the article support traveling along the predetermined transport path; and
a controller configured to adjust timing of loading the article to the article-loading position by the second conveyor device by controlling timing of loading the article onto the second conveyor device from the first conveyor device, the controller being further configured to control the second conveyor device to load, at the article loading position,
the article to a certain article support in every predetermined number of article supports from among a plurality of article supports traveling along the predetermined transport path.

4. The article transport facility according to claim 3, wherein the controller is configured to control the second conveyor device to load the article onto the article support after a predetermined number of article supports pass through the article-loading position subsequently to the article support to be loaded with the article when the article is not allowed to be loaded onto the article support to be loaded with the article determined by the controller.

* * * * *